United States Patent
Rosenkranz et al.

(10) Patent No.: US 9,504,231 B2
(45) Date of Patent: Nov. 29, 2016

(54) DEVICE FOR THE MEASUREMENT OF INDIVIDUAL FARM ANIMAL DATA

(75) Inventors: Stefan Rosenkranz, Graz (AT); Mario Fallast, Graz (AT)

(73) Assignee: VitaVis GmbH, Muenster (DE)

( * ) Notice: Subject to any disclaimer, the term of this patent is extended or adjusted under 35 U.S.C. 154(b) by 813 days.

(21) Appl. No.: 13/520,101

(22) PCT Filed: Dec. 22, 2010

(86) PCT No.: PCT/AT2010/000490
§ 371 (c)(1),
(2), (4) Date: Jun. 29, 2012

(87) PCT Pub. No.: WO2011/079338
PCT Pub. Date: Jul. 7, 2011

(65) Prior Publication Data
US 2012/0277550 A1    Nov. 1, 2012

(30) Foreign Application Priority Data

Dec. 30, 2009   (AT) ................................ A 2052/2009

(51) Int. Cl.
*A61B 5/07* (2006.01)
*A61D 99/00* (2006.01)
*A01K 11/00* (2006.01)

(52) U.S. Cl.
CPC .................................... *A01K 11/007* (2013.01)

(58) Field of Classification Search
CPC ........ A61B 1/00; A61B 5/07; A61B 5/1473; A61B 5/14735; A61B 5/14865
USPC ........................................................ 600/302
See application file for complete search history.

(56) References Cited

U.S. PATENT DOCUMENTS

| 5,111,799 | A | * | 5/1992 | Senger et al. | ................ 600/551 |
| 6,012,415 | A | * | 1/2000 | Linseth | .................. A01K 11/00 119/174 |
| 6,099,482 | A | | 8/2000 | Brune et al. | |
| 6,371,927 | B1 | * | 4/2002 | Brune et al. | .................. 600/549 |

(Continued)

FOREIGN PATENT DOCUMENTS

| GB | 2455700 A | 6/2009 |
| NL | 1008514 C2 | 9/1999 |

(Continued)

OTHER PUBLICATIONS

European Patent Office, International Search Report for Application No. PCT/AT2010/000940, mailed Sep. 22, 2011.

*Primary Examiner* — Michael Kahelin
*Assistant Examiner* — Mitchell E Alter
(74) *Attorney, Agent, or Firm* — Sand & Sebolt

(57) ABSTRACT

The invention relates to a measuring device for the measurement of at least one physiological parameter of a farm animal's organism, whereby the measuring device is placeable in the gastro-intestinal tract of livestock and comprises the following components arranged in a casing: at least one sensor for the measurement of at least one physiological parameter of a farm animal, at least one transmitter with antenna for the wireless transmission of information, at least one control unit for controlling the measuring device, and at least one power supply device for the measuring device, whereby a hollow protective guard is provided inside the casing which covers at least the power supply unit in order to protect it from mechanical impact.

18 Claims, 2 Drawing Sheets

(56) References Cited

U.S. PATENT DOCUMENTS

Figure 5:
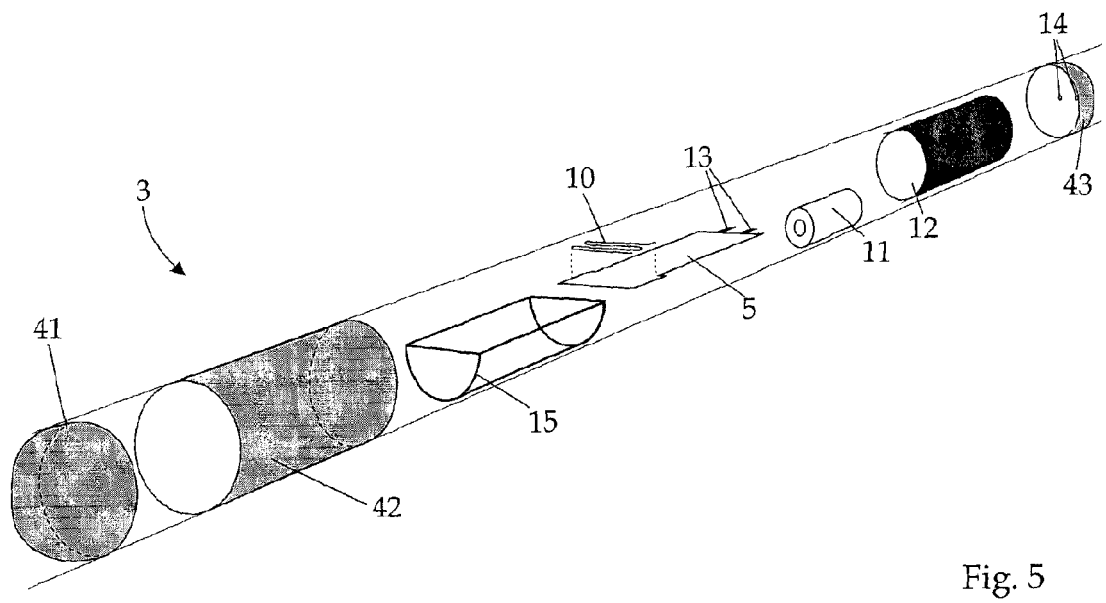

| | | | |
|---|---|---|---|
| 7,112,752 B1 * | 9/2006 | Wenner | A61B 1/00036 200/61.04 |
| 7,558,620 B2 * | 7/2009 | Ishibashi | A61B 1/00016 128/903 |
| 2001/0001176 A1 | 5/2001 | Caja Lopez et al. | |
| 2002/0010390 A1 * | 1/2002 | Guice | A01K 11/008 600/300 |
| 2002/0156356 A1 | 10/2002 | Mehrotra | |
| 2004/0133131 A1 | 7/2004 | Kuhn et al. | |
| 2006/0155174 A1 * | 7/2006 | Glukhovsky et al. | 600/301 |
| 2007/0285225 A1 * | 12/2007 | Koyama | A61B 5/0002 340/539.12 |
| 2008/0236500 A1 | 10/2008 | Hodges et al. | |
| 2009/0182207 A1 * | 7/2009 | Riskey | A61B 5/0031 600/302 |
| 2010/0008963 A1 * | 1/2010 | O'Donoghue | A01N 25/002 424/410 |

FOREIGN PATENT DOCUMENTS

| | | |
|---|---|---|
| WO | 9305648 A1 | 4/1993 |
| WO | 2005104930 A1 | 11/2005 |
| WO | 2006046057 A1 | 5/2006 |

* cited by examiner

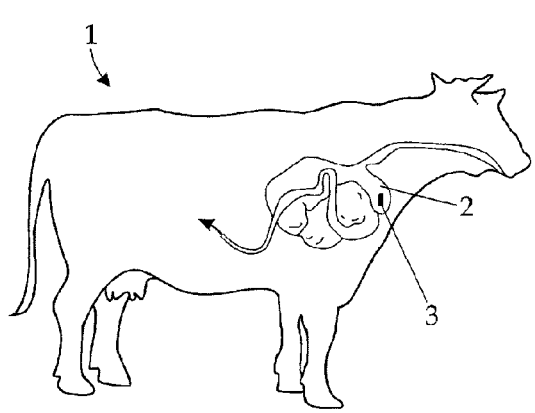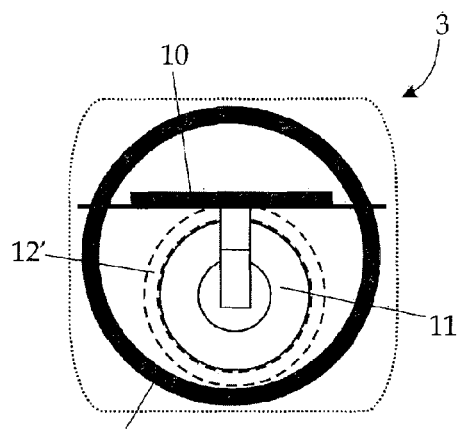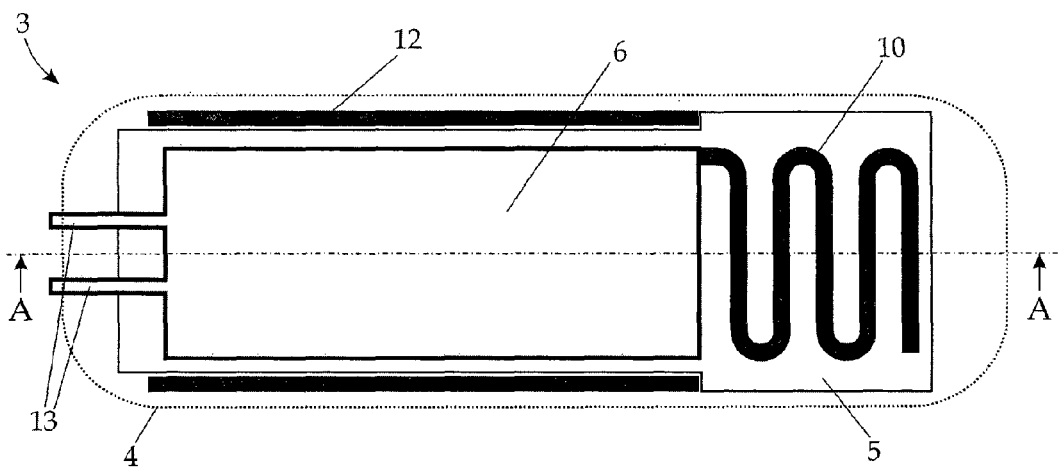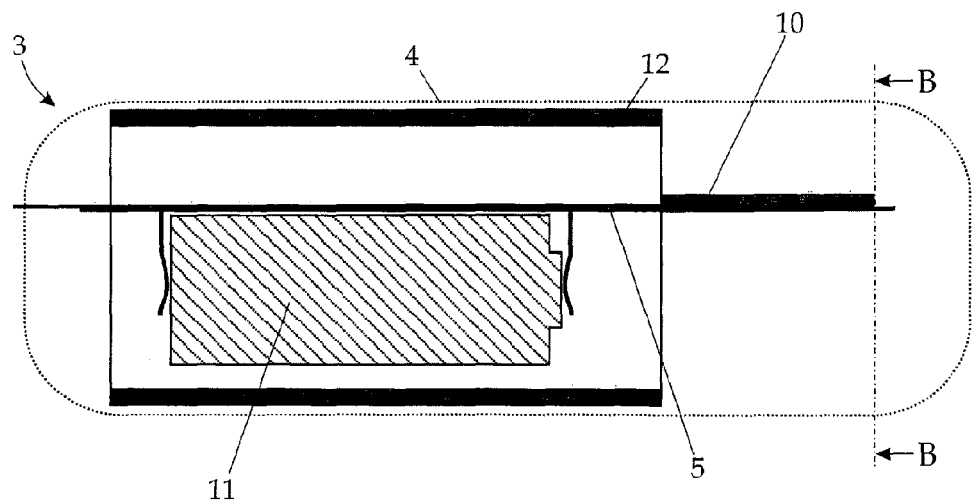

DEVICE FOR THE MEASUREMENT OF INDIVIDUAL FARM ANIMAL DATA

The present application is a U.S. National Stage Application of PCT application Serial No. PCT/AT2010/000490, filed on 22 Dec. 2010, which claims priority from Austrian Patent Application Serial No. A 2052/2009, filed on 30 Dec. 2009, both of which are incorporated by reference in their entireties.

The invention concerns a device for measuring at least one physiological parameter of a farm animal organism, whereby such device can be placed in the gastro-intestinal tract of the farm animal and contain at least one sensor for measuring at least one physiological parameter of the farm animal organism, at least one transmitter with antenna for the wireless transmission of information, at least one control unit for controlling the device, and at least one power supply device for supplying the device with power.

The invention further relates to a system, comprising at least one of the aforementioned devices and a base station, the base station and the device communicating with each other via a wireless procedure. A base station may for example be a data processing unit which communicates with one or several devices by means of antennas and processes and stores the transmitted information.

Livestock farming, in particular of dairy cattle, is currently subject to structural changes, especially in Europe with a tendency towards large-scale farming. In this context, herd management turns out to be increasingly difficult, e.g. when it comes to controlling the health of individual animals or to allocating feeds. With increasingly large herds, symptoms of illness in individual animals are frequently not detected in time, and customized feeding is hardly possible. In order to ensure both appropriate feed and care for the animals and to make farming economically viable, it is enormously important for farmers to keep themselves precisely informed about their animals' state of health.

Let us take the example of cattle farming: especially in high-yield dairy cattle herds, e.g. Subacute Ruminal Acidosis (SARA) is a widespread problem, and mostly cumulative in a herd. The negative effects of SARA on the livestock's health are multifarious and represent a central factor that reduces production figures in cattle farming. For various reasons, SARA is a pathological and disease-causing state that is not always diagnosed accurately. The lack of simple and specific diagnostic methods, and/or the proneness of applicable diagnostic methods to mistakes have led to a situation where the diagnosis so far is usually made indirectly and retrospectively (e.g. via the fat content of the milk, fat protein ratio) and/or based on secondary clinical symptoms (e.g. thin, mushy excrement containing an increased percentage of undigested elements).

In order to solve these problems, devices were developed that can be placed directly in the gastro-intestinal tract of livestock in order to measure physiological data. For example DE 199 01 124 A1 describes such a device, consisting of a probe in bolus form, which is inserted into the gastro-intestinal tract of cattle, and of a controllable monitoring device, which communicates with the probe via a wireless procedure. A bolus form is commonly understood to be a pill form, thus essentially an object with an oval cross-section along its longitudinal axis. The probe contains sensors for the measurement of one or several different physiological parameters, such as pressure, temperature, conductivity, pH value, or ammonia content in the gastro-intestinal tract.

Similar solutions are described in U.S. 2004/0133131 A1, WO 01/13712 A1, U.S. Pat. No. 5,984,875, WO 2006/046057, and GB 2455700. U.S. Pat. No. 6,694,161 B1 additionally shows an illustrative embodiment, in which the pH sensor and a transmitter located outside the animal are connected via a cannula needle.

The said devices are mostly fragile devices that are only insufficiently protected from heavy mechanical influence. Damage during their utilization caused by sharp-edged individual parts or harmful substances may thus jeopardize the health of the farm animal in question.

It is thus an aim of the invention to come up with a device that overcomes the said disadvantages of prior art.

According to the invention this problem is solved by a device of the initially-mentioned kind, wherein a hollow protective guard, covering at least the power supply device to protect it from mechanical impact, is arranged inside the casing.

Thanks to the invention it is possible to ensure real time livestock monitoring. Due to the wireless transmission of the information registered by the device cost-effective integration into similar or existing feeding systems which are also based on wireless procedures is possible. In such a case transmission is ensured by the transmitter, however, a transceiver device may also be provided for, which has the advantage of both transmitting and receiving data.

On the one hand, the protective guard protects the sensitive parts of the device from mechanical impact, for example from bites in case the device lands in the mouth or between the teeth of livestock. At least the power supply device, which frequently contains harmful substances, should be covered by the protective guard, in order to protect the animal from injury, e.g. from poisoning, in case of excessive mechanical strain to the device.

On the other hand, the protective guard allows for increase and/or customization of the weight—i.e. the specific weight—of the device, in order to ensure optimal positioning of the device in the gastro-intestinal tract of the farm animal. This enables proper data acquisition by the at least one sensor.

In addition, if the protective guard is manufactured from a conductive material, it is possible to improve the electromagnetic conditions for the device (or the antenna of the transmitter, respectively), in order to positively influence the radiation pattern of the antenna.

Advantageously, the protective guard does not entirely cover the elements to be protected, but is executed in such a way that they may be inserted into the protective guard and removed if necessary. The protective guard thus ideally has cylinder form, with a circular or polygonal cross-section. Ideally, the bottom and cover surfaces are left open. In the following description, the term polygonal cross-section is intended to mean a polygonal cross-section which may be triangular, quadrangle, hexagonal, octagonal or designed to have more angles. Due to the regular design, an improved reception and distribution of mechanical impacts is achieved and damage to the elements covered by the protective guard is avoided.

In one variant of the invention, the protective guard is made of metal. Possible materials are for example steel or brass, which are easy to process and available at low price, thus permitting a time- and cost-saving production of the device according to the invention. A condition for its utilization is the aforementioned requirement of resistance against mechanical impact. For the above-mentioned reasons, the choice of the material also depends upon the specific weight of the material used and upon its effect on the total weight of the device.

In another variant of the invention, the protective guard covers not only the power supply device, but also the transmitter and the control unit, and thus protects further sensitive parts of the device from damage. At the same time, the enlarged surface of the protective guard may lead to an increased weight of the device. As mentioned above, the protective guard is preferably designed in such a way as to enable easy insertion and, if necessary, removal of the parts to be protected. If the protective guard is executed in cylinder form, this may be achieved by leaving open the bottom and cover surfaces.

Basically different antenna types may be used—for example the antenna may be executed as dipole or directional antenna. Also the dimensioning is more or less left to discretion and may be a length of one half the frequency used ($\lambda/2$), for instance. However, it is important to consider the limited space in the casing of the device. The length of the transmitter antenna should preferably be dimensioned to a length of one fourth the frequency used ($\lambda/4$).

The transmitter transmits information via frequencies in the range of 20 MHz to 1 GHz. In a variant of the invention the transmitter transmits information via frequencies ranging from 300 MHz to 450 MHz. In Europe a frequency of 433 MHz is used, for instance. For applications in the USA a frequency of 315 MHz may be used. Furthermore the use of ISM-radio bands (Industrial-, Scientific- and Medical band) in the range of 868 MHz or 915 MHz is possible.

Good results are achieved with antennas in meander form with at least one loop. Meander form is intended to mean a form consisting of one or more interconnected loops in serial arrangement. The term meander derives from the bends in a sinuous watercourse. The loops of the meandered antenna may in this case be angular or circular. The antenna is dimensioned according to the frequency used. The meander form enables the use of long antennas in a small space. The meandered antenna has the omnidirectional radiation pattern that is required for the proper functioning of the device and is easy to tune, a property which is for example necessary for protective guards made of metal which, together with the power supply unit, influence the radiation pattern.

In one variant of the invention, the device is equipped with at least one switch which is connected to the control unit and may be actuated from outside the device. The switch serves for example for activating and/or deactivating the device. Basically the switch may be of any kind, as long as it withstands the conditions under which the device is used. In the present case, this would be the acid environment of the gastro-intestinal tract of a farm animal, such as a cow.

The switch may be configured as a magnetic switch (eg. a Reed-switch) which is located inside the measuring device 3. Here, the term magnetic switch denotes a switch that can be switched by a magnetic field. In the present case the measuring device 3 may be activated (or deactivated) by applying a magnetic field at a certain position of the measuring device. A Reed-switch basically consists of two contacts which are arranged in vacuum or inert gas; when a magnetic field (permanent magnet or electromagnet) is applied the contacts are brought into contact and, hence, close a circuit.

In another variant of the invention, the switch is executed in form of at least two contacts connected to the control unit, which protrude from the device through openings in the casing, whereby the control unit activates the device by short-circuiting the contacts. This means that the control unit activates the measuring device when the contacts are short-circuited. This may be achieved by providing a start-up circuit with two MOSFETS. The first MOSFET is connected to the contacts, and by short-circuiting the contacts the second MOSFET is actuated so that the battery load is switched over to the control unit and from there to the areas necessary for the functioning of the measuring device. The short-circuiting of contacts can be achieved, for example, by providing a support for inserting the device, whereby its insertion would cause the short-circuiting of the contacts.

In addition, the device comprises at least one storage unit for data storage. This storage unit advantageously is a conventional storage chip (EEPROM—electrically erasable programmable read-only memory); however other storage devices such as SD cards, flash memories or the like are also possible. When the device is provided with a RFID transponder, a storage unit of the RFID transponder may be used for data storage.

The goal of the invention is furthermore achieved by using a system as initially mentioned, which comprises at least one of the above-cited devices and at least one base station.

Figure 6:
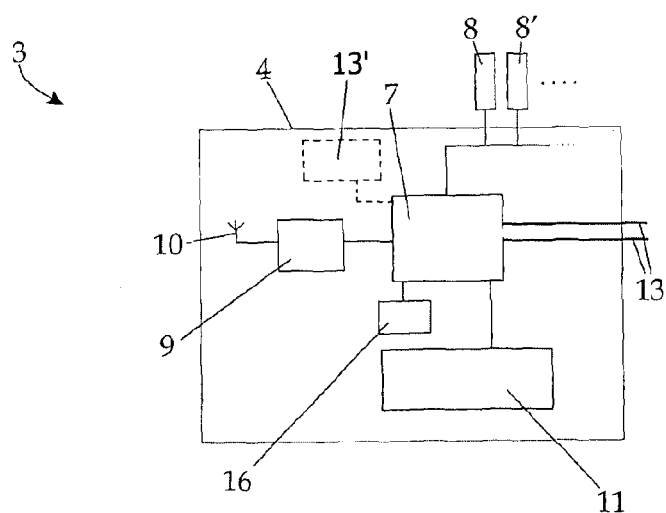

In the following, the present invention is described in more detail with reference to the drawings, which show:

FIG. 1 a cow with a device according to the invention placed in its gastro-intestinal tract, FIG. 2 a plan view of a sectional view of the device according to the invention, FIG. 3 a side view of a sectional view along the line A-A in FIG. 2, FIG. 4 a front view of a sectional view along the line B-B in FIG. 3, FIG. 5 an exploded view showing the individual parts of the device according to the invention, and FIG. 6 a schematic drawing of the components of the device.

It should be appreciated that the invention is not restricted to the following embodiments which merely represent one of the possible implementations of the invention. Furthermore, it is noted that the representations in the figures are only schematic for the sake of simplicity.

FIG. 1 shows the sectional view of a cow 1, whereby the cow 1 in this case only serves as an example of a farm animal in whose gastro-intestinal tract the device can be inserted. Examples for other suitable livestock are e.g. sheep, goats, and wild ruminants, such as red deer.

The feed ingested and masticated by the cow 1 ends up in the stomach of the cow 1, e.g. in the rumen or reticulum 2. The reticulum 2 is part of the cow's 1 stomach, located before the rumen. From the reticulum 2, the ingested feeds either move forward into the rumen, or backward into the mouth of the cow 1 for rumination.

The feeds in the stomach of the cow 1 roughly can be divided into three phases: at the top is the gaseous phase containing $CO_2$ and methane ($CH_4$). In between is a solid phase, the so-called "fiber mat", containing pre-digested hay, silage grass etc. In the lower portion is the rumen fluid, consisting of liquids, such as acids, microbes, saliva, water, and masticated material. Measuring the physiological parameters of the stomach contents allows one to draw conclusions about possible effects and/or conclusions as to the animal's state of health—whenever the pH is low, e.g. rumen acidosis may occur. The measuring device 3 according to the invention is thus placed within the gastro-intestinal tract of the animal—i.e. in the present example in the area of the reticulum 2 of the cow 1 in order to capture physiological data of the stomach.

FIGS. 2, 3 and 4 show the measuring device 3 according to the invention in different sectional views. The measuring device 3 is inserted into the gastro-intestinal tract of a ruminating farm animal by appropriate means and remains there. To introduce the measuring device 3, e.g. a balling gun common in livestock farming is used.

FIG. 2 shows a plan view of a section along the longitudinal axis of the inventive measuring device 3, hereinafter also referred to as bolus, whereby the same reference sign is used as for the measuring device 3.

The casing 4 of the bolus 3 has a cylinder form with rounded edges of large radiuses, whereby external burrs should be avoided in order to minimize the risk of injury for the animal. The materials for the casing 4 are preferably acid-proof, impact-strong plastics, which ideally comply with the rules of the American Food and Drug Administration (FDA). The casing 4 should not break irregularly below a certain load threshold. When choosing the plastic to be used the acid environment of the animal's gastro-intestinal tract should be taken into account.

The casing 4 is lockable and can, for this purpose, be composed of several parts, for example of two or three interlockable parts (see FIG. 5). The casing 4 contains the devices necessary for the measuring of physiological parameters. These devices are arranged on a printed circuit board 5 (PCB). The exact arrangement is not illustrated in FIG. 2, since a number of arrangements are possible which are well known to the person skilled in the art. Reference is made to only one area 6 of the printed circuit board 5 in which the individual components are located.

FIG. 6 shows a schematic drawing with the components of the inventive device 3 and their connections. The components are located in a casing 4. The casing comprises a control unit 7 for controlling the measuring device 3. This may for example be achieved using an adequately programmed micro-processor. The control unit 7 controls and processes data from the sensors 8, 8'. A storage unit 16, for example a storage chip or an SD card, may be provided for data storage. At least one sensor 8, 8' is to be provided, however, more than two sensors may also be used. The sensors 8, 8' measure parameters of their surroundings such as pH and temperature. However, also sensors for measuring glucose, volatile fatty acids (especially mixed fatty acids), acetate, propionate, butyrate, and lactate may be suitably provided for. The sensors 8, 8' are mounted in such a way as to be able to get in contact with the environment of the measuring device 3, for example through openings (not illustrated in the figures).

The data are processed by the control unit 7. Via a transmitter device 9, equipped with an antenna 10, the data are transmitted wirelessly, for example to a base station located outside the animal. Preferably, the transmitter 9 is designed as transceiver device 9 which is able to both transmit and receive data. Hence, the term transceiver 9 will be used in the following.

Via the antenna 10 and the transceiver 9 it is possible to influence the control unit 7 from the outside, for example in order to modify the internal programming. The antenna 10 may be executed in various ways, for example as helical antenna or corkscrew antenna, or as ceramic and/or patch antenna.

The transceiver 9 operates in the frequency range 20 MHz to 1 GHz. Frequency bands that are frequently used in similar applications range from 300 MHz to 450 MHz. The frequency 433 MHz is used in Europe, for instance. For an application in the USA the frequency 315 MHz may be used. However, other useable ISM-radio bands (Industrial, Scientific and Medical band) lie in the range of 868 MHz or 915 MHz. Also the frequency 27 MHz may be used.

The transceiver realized as RFID transponder is also possible. In this case, depending on its design variant the RFID transponder, may be contain an antenna, a switching circuit for the transmitting (and receiving) of data, a circuit for controlling the transponder as well as a memory, for example in form of a tag. The switching circuit for transponder control writes data into the memory (e.g. the tag). In a special design, this switching circuit may be located outside the RFID transponder, in the present case for example as part of the control unit 7 on the printed circuit board 5. The RFID transponder is then read out via a stimulation by means of a high-frequency alternating field. In such a case the RFID transponder is to be adequately arranged on the printed circuit board 5.

When using an RFID transponder, data are transmitted within a frequency range of 128 kHz (long-wave range) up to 13.56 MHz (short-wave range), or within a range of 865-869 MHz (European range) up to 950 MHz (US American and Asian frequency ranges). Frequency may vary from one region to the other.

As far as construction size and other specifications are concerned it is possible to choose from a number of well-known solutions.

The power supply device may be a battery 11 or an accumulator.

The antenna 10 in FIG. 2 is executed as meandered antenna. It consists of several loops of an appropriate carrier material, which are arranged on the level of the printed circuit board 5. Antenna 10 in the mentioned design enables an optimal compromise between the radiation pattern in the vertical and horizontal planes of polarization, the necessary adaptation and cost-effective production. The meandered antenna can be optimized for a direct connection of the antenna base to the printed circuit board 5 so that no additional adaptation is necessary, which further reduces production costs.

FIG. 3 shows a lateral cross-section of the measuring device 3 along the line A-A in FIG. 2. It shows that the battery 11 is arranged below the printed circuit board 5 within the casing 4. The illustration of battery 11 and its arrangement is, however, only given as example; it may also be arranged in any other form according to the commonly available battery or accumulator forms.

The power supply units used, for example lithium batteries, generally contain substances that are potentially harmful for livestock. Therefore the inventive device 3 is designed to contain a hollow protective guard 12 covering at least the battery 11 in order to protect it from mechanical impact. Such impact may for example occur when the cow 1 regurgitates the measuring device 3 back up into its mouth together with the feed to be ruminated and then bites into the measuring device 3.

Preferably, the guard 12 is executed in cylindrical form. In the pictured embodiment the cylinder has a circular cross-section (see FIG. 4), however the cross-section may also have a polygonal form. Ideally, both the top and bottom planes are open so that the appliances to be protected are easily inserted into the device. The protective guard 12 may be made from any material that resists high mechanical impact, for example from plastics such as Kevlar™, or metals, such as brass or similar metals.

In the illustrated embodiment, the protective guard 12 surrounds not only the power supply unit 11 but also most of the printed circuit board 5 with the aforementioned components (for example also the aforementioned RFID transponder). Preferably, the antenna 10 is arranged outside the protective guard 12—in order to minimize the impairing of the radiation pattern, which is considerable, especially where a metallic material is used for the protective guard 12. FIG. 4 shows a variant of the invention in a dotted outline, in which a protective guard 12' surrounds only the battery 11. In such a case, the protective guard 12 of a higher diameter may be omitted—it is however possible to provide for a combination of a protective guard 12' for the battery and another bigger protective guard 12 surrounding it.

The protective guard 12 serves both as protection from mechanical influence ("bite protection") and as additional weight, providing the device 3 with sufficient density to ensure that it remains in a location within the gastro-intestinal tract which is favorable for data reception by the sensors 8, 8'. If the protective guard 12 is made of metal, it may improve the radiation pattern of antenna 10 by altering the electromagnetic near field of the antenna 10.

In addition to its "bite protection" function, the protective guard 12 contributes to the weight of device 3. The weight, i.e. the specific gravity (density) of the measuring device 3 is highly important for the proper positioning of device 3 within the gastro-intestinal tract of the farm animal in question. Thus the weight of the entire measuring device 3 may be influenced by the material selected for and the thickness of the protective guard 12. For example it is also possible to vary the thickness of the protective guard 12 lengthwise.

In order to further increase the weight of the measuring device 3, it is possible to fill the inside of the casing 4 with a thermosetting material, such as synthetic resin. When filling in the material, the antenna 10 is ideally left out in order to ensure proper data transmission.

In the depicted embodiment of the invention the device 3 is equipped with a switch. The switch may basically be executed in any form—here the switch consists of two metal contacts 13, for example in stainless steel, which are connected to the control unit 7. These contacts protrude from device 3 through openings 14 in the casing 4 (see FIGS. 2 and 5). The measuring device 3 is activated by short-circuiting the contacts 13 for a certain period of time, ranging from a few milliseconds to several seconds.

The circuiting of the contacts 13 within the control unit 7 which is necessary for this is state of prior art. For example, the contacts 13 may be connected to a start-up circuit in the control unit 7 which comprises two MOSFETs (metal oxide semiconductor field-effect transistors), whereby one of the MOSFETs is connected to the contacts 13. By short-circuiting the contacts 13, the second MOSFET switches the battery voltage onto the circuitry within the control unit 7, which thereby activates the measuring device 3.

In order to facilitate the short-circuiting process for the user, a rack may be provided into which the measuring device 3 can be placed, thus activating the measuring device 3 by short-circuiting the contacts.

The switch of the above-described design only ensures activation of the measuring device 3, which continues to function until the end of the battery run time, and/or until a pre-definable switch-off time point. Basically any other kind of switches may be provided for, in order to activate and deactivate the measuring device 3. A wide range of switches for this purpose are prior art.

In a variant of the invention a magnetic switch 13' is used which is arranged inside the measuring device 3 (see dashed object in FIG. 6). A magnetic switch 13' here denotes a switch that can be switched by a magnetic field. An example of such a magnetic switch 13' is a Reed-switch. Basically, a magnetic switch 13' has two contacts which are arranged in a protective atmosphere and do not touch each other. However, if a magnetic field is applied the two contact tongues attract and touch each other, consequently closing a circuit.

The magnetic switch 13' may be combined with a second MOSFET as described above so that a switching of the magnetic switch 13' puts the battery voltage through to the rest of the circuit in the control unit 7, thereby activating the measuring device 3.

The switching of the magnetic switch 13' may be effected by applying a magnetic filed to a specific position of the measuring device 3, by attaching a permanent magnet or an electromagnet, for instance.

FIG. 5 shows the individual components of the inventive measuring device 3 in an exploded view. In this case the casing consists of three parts, a casing front part 41 (which may for example be designed to contain openings for the sensors 8, 8'), a casing central part 42 housing the printed circuit board 5, and a casing rear part 43, the parts being interconnectable. The three-part structure of the casing with parts 41, 42, 43 in this case only serves as example—the design may provide for more or less casing parts. In order to facilitate the insertion of the measuring device 3 into the animal, the rear part of the casing 43 may have a flat end, which cooperates with the movable end of the balling gun that is used for inserting the device so that the measuring device 3 is properly moved into the rumen and does not get stuck.

In addition to the above-described components (which are not shown in the figures), the printed circuit board 5 includes the meandered antenna 10 and the contacts 13. The printed circuit board 5 is held in place by means of a rack 15 and supplied with power by means of a battery 11. The protective guard 12 may be placed around these components.

The rear part of the casing 43 comprises openings for the contacts 13.

Upon activation and insertion into the gastro-intestinal tract of the animal, the measuring device 3 performs measurements in certain time intervals. These intervals may range from 1 sec to several hours or even days. The measured data are stored on a storage unit 16, for example an EEPROM storage chip, an SD memory, or a flash memory. If the device 3 contains an RFID transponder, the data may be stored in the memory of the transponder. It is also possible to directly transmit the data wirelessly to the exterior.

If the measuring device 3 is used as part of a system together with at least one base station, such base station regularly searches for measuring devices within its reach with an inventory command. The distance between the measuring device and the base station in this case is for example 5 to 6 m or less. As soon as a measuring device 3 is within reach, it identifies itself by means of an identifier (serial number, bolus number or similar). Thereafter the base station checks whether the measuring device 3 contains any newly measured data. In this the case, the measured data are read out, stored in the base station (e.g. in a database), and then deleted from the measuring device 3. The base station then processes the measured data by means of appropriate routines so as to enable quick assessment of the data. Such an assessment may for example lead to a change in the feed ration administered.

The invention claimed is:

1. A measuring device for the measurement of at least one physiological parameter of a farm animal organism, wherein the measuring device is placeable in the gastrointestinal tract of the farm animal and comprises the following components arranged within an interior of a casing:
- at least one sensor for the measurement of at least one physiological parameter of the farm animal organism;
- at least one transmitter;
- an antenna provided on the at least one transmitter for wireless transmission of information;
- at least one control unit for control of the measuring device;
- at least one power supply device for the measuring device; and
wherein the casing further includes:
- a hollow protective guard covering the at least the one power supply device in order to ensure protection from mechanical impact; and wherein the protective guard is sufficiently strong enough to withstand being bitten or chewed by the farm animal organism and to continue to cover and protect the at least the one power supply device; wherein the antenna is located outside of the protective guard; and wherein the protective guard serves both as bite protection and as an additional weight, and wherein the measuring device is arranged such that an outermost region of the measuring device comprises the casing; and the protective guard is located within the interior of the casing, and wherein then the components to be protected are located within an interior of the protective guard.

2. The measuring device according to claim 1, wherein the protective guard has a cylinder form with a circular or polygonal cross-section.

3. The measuring device according to claim 1, wherein the protective guard is made of metal.

4. The measuring device according to claim 1 wherein the protective guard covers the transmitter and the control unit in addition to the power supply device.

5. The measuring device according to claim 1, wherein the length of the antenna of the transmitter is dimensioned to λ4 of the frequency used, wherein λ represents the wavelength of the information transmitted by the antenna.

6. The A measuring device according to claim 1, wherein the transmitter uses frequencies ranging from 20 MHz to 1 GHz for the wireless transmission of information.

7. The measuring device according to claim 1, wherein the transmitter uses frequencies ranging from 300 MHz to 450 MHz for the wireless transmission of information.

8. The measuring device according to claim 1, wherein the antenna is designed in meander form with at least one loop.

9. The measuring device according to claim 1, wherein the measuring device additionally has at least one switch connected to the control unit which is actuated from outside the device.

10. The A measuring device according to claim 9, wherein the switch is a magnetic switch, the magnetic switch being located inside the measuring device.

11. The measuring device according to claim 9, wherein the switch is comprises at least two contacts that are connected to the control unit and stand out from the measuring device through openings in the casing whereby the control unit activates the measuring device when the contacts are short-circuited.

12. The measuring device according to claim 1, wherein at least one storage unit is provided for the purpose of data storage.

13. The system for the measuring of physiological parameters of a farm animal organism, comprising at least one measuring device according to claim 1, as well as at least one base station, whereby the base station and the measuring device communicate with each other via a wireless procedure.

14. The measuring device according to claim 10, wherein the magnetic switch is a reed-switch.

15. The measuring device according to claim 1, wherein the measuring device is of a weight that substantially keeps the device within the gastrointestinal tract of the farm animal and resists elimination from the animal's body.

16. The measuring device according to claim 1, further comprising an additional protective guard; wherein the protective guard covers only the power supply and the additional protective guard surrounds the protective guard and the antenna is located outside of the protective guard and the additional protective guard.

17. The measuring device according to claim 1, further comprising a quantity of a thermosetting material sufficient to fill the interior of the casing.

18. The measuring device according to claim 17, wherein the thermosetting material is a synthetic resin.

* * * * *